(12) United States Patent
Bromley et al.

(10) Patent No.: US 6,669,001 B1
(45) Date of Patent: Dec. 30, 2003

(54) LINEAR BELT SORTER AND METHODS OF USING LINEAR BELT SORTER

(75) Inventors: Arlo Stephen Bromley, Mason, OH (US); Mark W. Henson, Danville, KY (US); Charles O. Burdine, II, Somerset, KY (US)

(73) Assignee: Mathews Conveyor, Inc., Danville, KY (US)

( * ) Notice: Subject to any disclaimer, the term of this patent is extended or adjusted under 35 U.S.C. 154(b) by 0 days.

(21) Appl. No.: 10/292,224

(22) Filed: Nov. 12, 2002

(51) Int. Cl.[7] .............................................. B65G 47/10
(52) U.S. Cl. ........................ 198/370.06; 198/370.02; 198/370.1
(58) Field of Search ..................... 198/370.01, 370.02, 198/370.03, 358, 370.06, 370.1, 371.2

(56) References Cited

U.S. PATENT DOCUMENTS

| | | | |
|---|---|---|---|
| 3,231,068 A | 1/1966 | Harrison et al. | |
| 4,096,936 A | 6/1978 | Nielsen | |
| 4,763,771 A | 8/1988 | Geerts | |
| 4,781,281 A | 11/1988 | Canziani | |
| 4,815,582 A | 3/1989 | Canziani | |
| 4,884,676 A | 12/1989 | Suizu | |
| 4,911,281 A * | 3/1990 | Jenkner | 198/370.03 |
| 4,930,613 A | 6/1990 | Okura et al. | |
| 5,690,209 A | 11/1997 | Kofoed | |
| 5,901,830 A | 5/1999 | Kalm et al. | |
| 6,253,910 B1 * | 7/2001 | Axmann | 198/370.06 |
| 6,273,268 B1 | 8/2001 | Axmann | |
| 6,283,271 B1 * | 9/2001 | van den Goor | 198/370.02 |
| 6,481,559 B1 * | 11/2002 | Maeda et al. | 198/370.02 |

* cited by examiner

*Primary Examiner*—James R. Bidwell
(74) *Attorney, Agent, or Firm*—Kenneth F. Pearce (57) ABSTRACT

The invention is particularly useful for sorting items of differing sizes. The endless loop's carriers include belts that both transport and sort the items. Followers clasp the belts about the lengthwise periphery of the carriers' slats and also engage lines, diverters, crossovers and receivers. When a follower is diverted toward a crossover, transverse sorting motion is imparted to its corresponding carrier's belt. Followers can also include delays for prolonging the longevity of the diverters. And when the size of the item being sorted mandates, a diverter can divert sequential followers, in series.

26 Claims, 13 Drawing Sheets

Mounting Lines, Crossovers And Controller Circuitry To The Sorter's Frame

Creating A Carrier For The Sorter By:

1) wrapping the belt about the slat
2) clasping securely the belt about the slat with the follower
3) depending the rider from the follower
4) forming the guide bearing beneath the slat, including a slit
5) incorporating a delay into the follower Connecting A Number Of Carriers To The Drive To Create The Sorter's Endless Loop Controlling Advancement Of And Diversion Of The Endless Loop's Followers Diverting One Or More Of The Endless Loop's Carriers' Followers
From A Line Toward A Crossover

FIG 15

Mounting Lines, Crossovers And Controller Circuitry To The Sorter's Frame

Creating A Carrier For The Sorter By:

1) wrapping the belt about the slat
2) clasping securely the belt about the slat with the follower
3) depending the rider from the follower
4) forming the guide bearing beneath the slat, including a slit
5) incorporating a delay into the follower Connecting A Number Of Carriers To The Drive To Create The Sorter's Endless Loop Controlling Advancement Of And Diversion Of The Endless Loop's Followers Diverting One Or More Of The Endless Loop's Carriers' Followers
From A Line Toward A Crossover Delaying Impartation Of Transverse Motion To Any Carrier's Belt
Whose Follower Has Been Diverted

FIG 16

Mounting Lines, Crossovers And Controller Circuitry To The Sorter's Frame
⬇

Creating A Carrier For The Sorter By:

1) wrapping the belt about the slat
    2) clasping securely the belt about the slat with the follower
    3) depending the rider from the follower
    4) forming the guide bearing beneath the slat, including a slit
    5) incorporating a delay into the follower
⬇

Connecting A Number Of Carriers To The Drive To Create The Sorter's Endless Loop
⬇

Controlling Advancement Of And Diversion Of The Endless Loop's Followers
⬇

Diverting Sequentially Some Of The Endless Loop's Carriers' Followers
From A Line Toward A Crossover
⬇

Delaying Impartation Of Transverse Motion To Any Carrier's Belt
Whose Follower Has Been Diverted

FIG 17

Mounting Lines, Crossovers And Controller Circuitry To The Sorter's Frame
⬇

Creating A Carrier For The Sorter By:

1) wrapping the belt about the slat
    2) clasping securely the belt about the slat with the follower
    3) depending the rider from the follower
    4) forming the guide bearing beneath the slat, including a slit
    5) incorporating a delay into the follower
    6) protruding the belt over a lengthwise edge of the slat
⬇

Connecting A Number Of Carriers To The Drive To Create The Sorter's Endless Loop
⬇

Controlling Advancement Of And Diversion Of The Endless Loop's Followers
⬇

Diverting Sequentially Some Of The Endless Loop's Carriers' Followers
From A Line Toward A Crossover
⬇

Delaying Impartation Of Transverse Motion To Any Carrier's Belt
Whose Follower Has Been Diverted

FIG 18

Mounting Lines, Crossovers And Controller Circuitry To The Sorter's Frame

Creating A Carrier For The Sorter By:

1) wrapping the belt about the slat
    2) clasping securely the belt about the slat with the follower
    3) depending the rider from the follower
    4) forming the guide bearing beneath the slat, including a slit
    5) incorporating a delay into the follower
    6) protruding the belt over a lengthwise edge of the slat
    7) incorporating a roller at each end of the slat Connecting A Number Of Carriers To The Drive To Create The Sorter's Endless Loop Controlling Advancement Of And Diversion Of The Endless Loop's Followers Diverting Sequentially Some Of The Endless Loop's Carriers' Followers From A Line Toward A Crossover Delaying Impartation Of Transverse Motion To Any Carrier's Belt Whose Follower Has Been Diverted

FIG 19

Mounting Lines, Crossovers And Controller Circuitry To The Sorter's Frame

Creating A Carrier For The Sorter By:

1) wrapping the belt about the slat
    2) clasping securely the belt about the slat with the follower
    3) depending the rider from the follower
    4) forming the guide bearing beneath the slat, including a slit
    5) incorporating a delay into the follower
    6) protruding the belt over a lengthwise edge of the slat
    7) incorporating a roller at each end of the slat
    8) dimensioning the carrier to pivot freely through a reverse bend as the carrier is circulated about the sorter Connecting A Number Of Carriers To The Drive To Create The Sorter's Endless Loop Controlling Advancement Of And Diversion Of The Endless Loop's Followers Diverting Sequentially Some Of The Endless Loop's Carriers' Followers From A Line Toward A Crossover Delaying Impartation Of Transverse Motion To Any Carrier's Belt Whose Follower Has Been Diverted

LINEAR BELT SORTER AND METHODS OF USING LINEAR BELT SORTER

BACKGROUND OF THE INVENTION

1. Field of the Invention

The present invention relates to endless loop sorters which have carriers that utilize belts to both transport and sort numerous items. Sortation of items of different sizes and shapes is within the scope of the present invention. And when the items to be sorted mandate, gripping enhancers can be applied to carriers' belts.

In accordance with the present invention, followers clasp the belts about the lengthwise periphery of the carriers' slats. The followers also move about the lengths of their respective slats. Select embodiments equip the carriers with guide bearings for the followers. In other embodiments, riders depend downward from the followers' clasps and through slits in the guide bearings to engage lines, diverters, crossovers or receivers. When a diverter diverts a follower from a line toward a crossover transverse motion is imparted to the carrier's belt.

In accordance with predetermined paradigms, when the size of the item being sorted mandates, the diverters can divert sequential followers, in series. For other embodiments, the followers can also include delays for prolonging the longevity of the diverters. Other embodiments include spatial orientations for the endless loop's carriers that virtually eliminate hiatuses between the sequential carriers. Still other embodiments of the current invention eliminate the gaps between the carriers.

2. Description of the Previous Art a) U.S. Pat. No. 4,930,613-Okura, et. al., enables a carrier including a flat belt (6). The flat belt (6) is capable of transferring items to be sorted at angles transverse to the forward movement of Okura's carrier. Two end portions of the belt (6) are fitted alternately in a folded back manner on the two side rollers (4) and inner rollers (5) and thereafter fixed to two sides of the carrier. Okura's carrier further includes his moving frame (3) that includes a depending roller (7) and depending pin (8). Pen (8) and roller (7) engage actuators (9a–9d) disposed in the transferring passage (2). The '613 moving frame (3) is formed by folding two ends of a narrow plate upward and equipping the frame (3) with a plurality of horizontal (19) and vertical (20) wheels. These wheels engage a pair of guide rails (21), and in operation, the Okura frame (3) moves at a right angle with respect the directional movement of the carrier (1). Importantly, for the '613 invention to function, inner rollers (5) must be arranged inside moving frame (3).

b) U.S. Pat. No. 4,884,676-Suizu teaches a type of cross-belt sorter. Suizu's belt (11) circumscribes his moving frame (4) while rollers (5) engage rails (2) and support the moving frame (4). The '676 drive pulley (13) causes belt (11) to move at right angles as compared with the forward motion of the moving frame (4). As enabled, Suizu's combination of friction wheels (16, 17), drive pulley (13), shafts (16a, 17a), bevel gear (24), shaft (24a), bearings (25), shaft (13a), sprockets (26, 27) and endless chain (28) form the transmission for moving frame (4). In operation, the belt (11) is able to move transversely due to Suizu's elaborate transmission.

c) U.S. Pat. No. 3,231,068-Harrison, et. al. describes an article delivery conveyor. Harrison's conveyor includes platforms (20). Among other structures, each platform includes a plurality of cleated belts (30, 32). The Harrison conveyor utilizes a rack and pinion (46, 48), shaft (36), pulley (38), discs (28), belt (40) and pulley (42) to move cleated belts (30, 32) in a direction perpendicular to the forward movement of the platforms (20).

d) U.S. Pat. No. 4,096,936-Nielson discloses a cross belt sorting conveyor. Among other structures, Nielson's belt (2) is supported by a plurality of wheels (26) mounted in brackets (28) which in turn are carried on vertical shaft pins (30) rotably secured to the base plate (32). Importantly, the '936 belt elements (4) rest on the top of wheels (26) directly with the lower side of the individual cross conveyor belts (12).

e) U.S. Pat. No. 6,273,268-Axmann enables a conveyor system for sorting piece goods. Axmann's combination of electro-magnetically or pneumatically actuated friction strips (36), friction wheel (32), shaft (31), bevel gear (30) and friction rollers (26) drive the sorting device's conveyor belt (18) to revolve toward an ejection station. Since the '268 Patent's friction wheel can be actuated in either direction, the Axmann belt can eject piece goods to either side of the conveyor.

f) U.S. Pat. No. 5,901,830-Kalm, et. al., discloses an electrically actuated bi-directional belt sorter. The '830 carrier (10) includes a pair of rollers (31, 32) supported at opposite ends of the top (12) of the carrier (10). Kalm's drive motor (38) is powered by the electrified track (200). The conveyor belt (36) is actuated by the rollers (31, 32), and in the preferred embodiment, drive belt (52) connects a pair of drive pulleys (54, 56). Kalm's drive pulley (54) is connected to roller (32) while drive pulley (56) is connected to the output shaft (40) of drive motor (38).

g) U.S. Pat. No. 4,781,281-Canziani defines a conveyor and discharge system for sorting items. Using a pair of rolls (4,5), Canziani mounts belt (3) to his carriage (1). The shaft (6) of roll (4) is keyed to pinion (7) for engaging corresponding pinion (8) of shaft (9). When wheel (12) of shaft (9) is seized between belts (13, 14), rotary motion is transmitted to roll (4) causing the belt (3) to rotate to discharge any item thereon.

h) U.S. Pat. No. 4,815,582-Canziani describes a cross-belt sorting apparatus incorporating permanent magnet D.C. electric motors to rotate the rotary belts (5, 14).

i) U.S. Pat. No. 5,690,209-Kofoed enables a cross-belt sorter. The '209 Patent utilizes electric motors for driving each carrier's belt transverse to the movement of the Kofoed endless loop which is consists of a plurality of chassis linked together to form a continuous chain.

j) U.S. Pat. No. 4,763,771-Geerts discloses a sorter utilizing trolleys. Among other structures, the Geerts trolley consists of an endless belt (7) running over pulleys (6). The pulleys (6) are fixed on axle (24). A first cable (25) and a second cable (27) are each wound around the axle (24). The combination of the cables, the axle and the pulleys drive the belt (7) to throw its load off.

SUMMARY OF THE INVENTION

Unlike traditional belt-type sorters, known more commonly as cross-belt sorters, when the size of the item to be sorted is larger that the width of a single belt, the present apparatus can diverter two or more of the endless loop's followers, in series, resulting in the sortation of the larger sized item. Conversely, when the size of the item to be sorted is smaller than or about the width of a single belt, a single follower is diverted which precipitates sortation of the smaller item. Depending upon the type of items to be sorted, carrier belts may be of differing widths or they can be equipped with a gripping enhancer.

A controller, or computer program, activates the diverters to divert the sorter's followers. When a follower is diverted, transverse motion is imparted to the carrier's belt. In select embodiments, electromagnetic induction can be used to guide the followers, but more often, mechanical tracks, electromechanical diverters, mechanical crossovers and mechanical receivers direct the sorter's followers as the endless loop is advanced. In accordance with the present invention, by coupling sequential carriers to the drive, an endless loop, having an upper half and a lower half, is formed.

In many of the embodiments of the present apparatus, the sorter's followers are guided about the length of the carriers' slats by the carriers' guide bearings, but the carriers can be sized so that the followers do not travel the entire lengths of the slats. As previously indicated, guide bearings can include slits for the followers' riders. In select embodiments, the riders may also incorporate depending bearings for engaging the sorter's lines, diverters or crossovers. Such embodiments have been found to meet the long felt need of reducing the wear and tear of the sorter's diverters.

In certain embodiments, the hiatuses between the endless loop's carriers are virtually eliminated. And as will be enabled more fully hereinafter, in other embodiments, gaps between the carriers are eliminated. The gaps may be eliminated by protruding the carriers' belts over the lengthwise edges of the carriers slats. Importantly and regardless of the embodiment practiced, the carriers are dimensioned to pivot through a reverse bend or reverse pivot, when required, as the endless loop circulates or advances about the sorter.

An object of the present invention is to provide a sorter utilizing carrier belts for sorting items.

It is another object of the present invention to enable methods of using the sorter.

Still another object of the present invention is to provide clasping followers for the sorter's carriers.

Yet another object of the present invention is to incorporate a delay into the carrier's follower so that the impartation of transverse motion to the carrier's belt is delayed for a predetermined time or distance.

Still another object of the present invention is to provide a follower including at least a one centimeter leeway.

Yet still another object of the present invention is to reduce wear and tear on the diverters.

It is yet another object of the present invention to virtually eliminate hiatuses between the carriers of the endless loop.

Still another object of the present invention is to eliminate the gaps between the endless loop's carriers.

Yet another object of the present invention is to dimension the endless loop's carriers to pivot through a reverse bend or reverse pivot.

It is another object of the present invention to provide a sorter capable of sorting differing sized items traveling along the endless loop.

Still another object of the present invention is to divert a single follower, thereby activating a single carrier's belt to sort a single item.

Yet another object of the present invention is to divert sequential followers, in series, thereby activating a series of carriers' belts to sort a single item.

It is yet another object of the present invention to provide for the simultaneous sortation of numerous items as they travel along the endless loop.

It is another object of the present invention to provide an endless loop that may be utilized with preexisting frames, lines, diverters, crossovers, switches, receivers, etcetera.

An embodiment of the present invention can be described as a sorter for sorting a plurality of items, comprising: an endless loop, wherein the endless loop further comprises a plurality of carriers circulating about the endless loop and wherein one or more of the carriers further comprises: a slat; a belt having a length approximate a lengthwise periphery of the slat, a follower for clasping the belt about the slat, and at least one connector; a plurality of lines for directing advancement of any of the followers; a plurality of crossovers for guiding transversely, relative to said endless loop's advancement, any of the followers; a diverter; a drive; a frame and a controller.

Another embodiment of the present apparatus can be described as a carrier for carrying a plurality of items for sorting, comprising: a slat; a belt fitted for and wrapped about a lengthwise periphery of the slat; a follower, including a rider for clasping the belt about the slat; a guide bearing for the follower; and at least one connector.

Still another embodiment of the present invention can be described as a method of imparting transverse motion to a belt of a carrier of an endless loop, comprising the steps of: creating a carrier, further comprising the steps of: wrapping the belt about a slat, clasping the belt about the slat with a clasp, depending a rider from the clasp for generating a follower, forming a guide bearing beneath the slat, including a slit in the guide bearing for the follower and incorporating a delay into the follower; connecting the carriers to a drive for creating the endless loop; circulating or advancing the endless loop; diverting one or more of the followers toward at least one crossover; and controlling advancement of and the diversion the followers.

Yet another embodiment of the present device can be described as a sorter for sorting a plurality of items, comprising: an endless loop having an upper half positioned above a lower half further comprising a plurality of circulating carriers, wherein one or more of the carriers further comprise: a slat; a belt having a length approximate a lengthwise periphery of the slat; a follower, including a rider, for clasping the belt about the slat and for moving the belt about the lengthwise periphery of the slat; at least one connector; a guide bearing for the follower; a plurality of lines; a plurality of crossovers; a plurality of diverters; a drive; a frame and a controller.

It is the novel and unique interaction of these simple elements which creates the apparatus and methods, within the ambit of the present invention. Pursuant to Title 35 of the United States Code, descriptions of preferred embodiments follow. However, it is to be understood that the best mode descriptions do not limit the scope of the present invention.

DESCRIPTION OF THE PREFERRED EMBODIMENTS

Although the disclosure hereof is detailed to enable those skilled in the art to practice the invention, the embodiments published herein merely exemplify the present invention.

Figure 1:
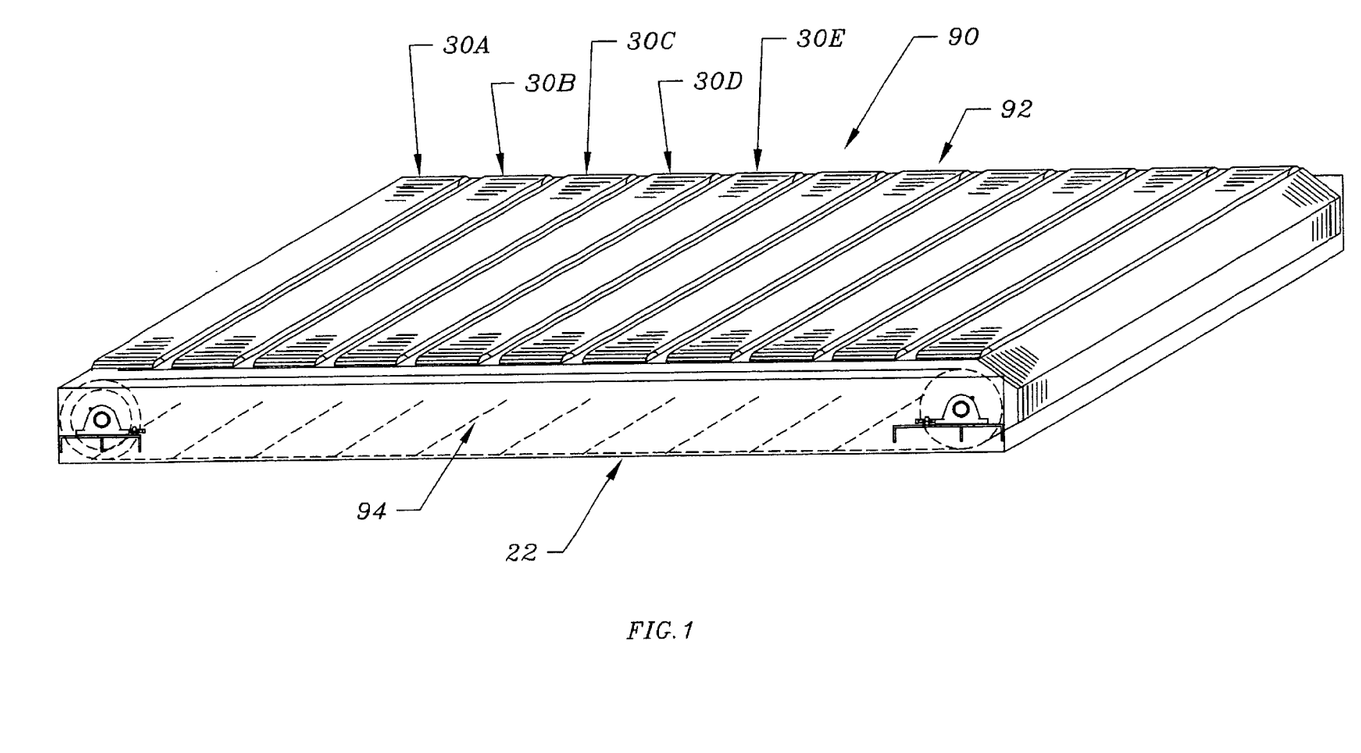
FIG. 1 depicts a side view perspective the endless loop, within the scope of the present invention.

FIG. 1 depicts a side view perspective the endless loop of a sorter within the scope of the present invention. The plurality of interconnected carriers (30A, 30B, 30C, 30D, 30E, etcetera) create endless loop (90), and as portrayed, endless loop (90) circulates with its upper half (92) positioned above its lower half (94). A drive (not shown) advances or circulates the endless loop (90).

Frame (22) can be manufactured from any material suitable in the art. And as will be later enabled and disclosed, frame (22) supports the sorter's drive, lines, crossovers and receivers, as well as the required circuitry for controlling diversion of the followers. A controller (not shown), such as a computer program, correlates advancement of the sorter and the diversion of the followers.

Figure 2:
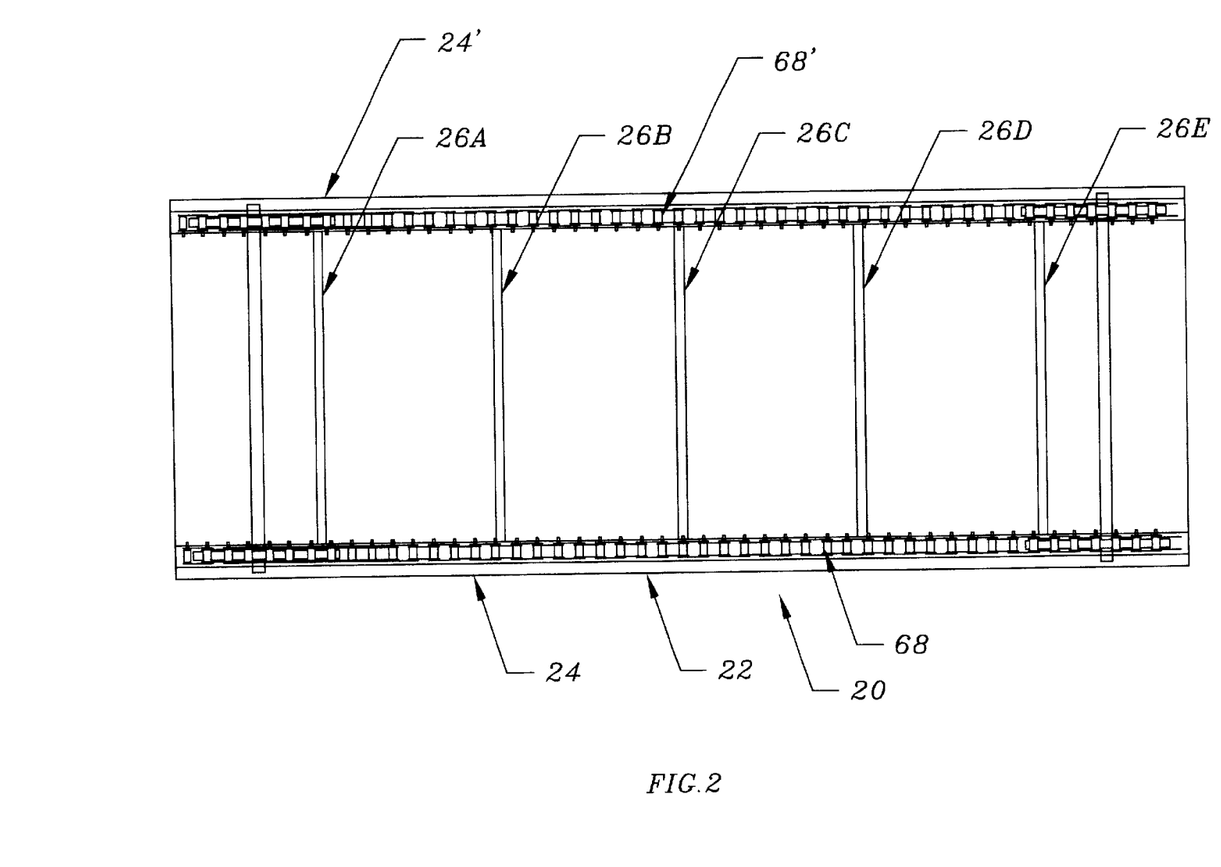
FIG. 2 is another representation of a sectional top view of sorter.

FIG. 2 is a sectional top view of sorter (20) having its carriers, lines, crossovers, diverters, receivers and switches cutaway. Frame (22) includes a pair of side rails (24 and 24'). Extending between side rails (24 and 24') are cross members (26A, 26B, 26C, 26D and 26E). Positioned near side rail (24) and above cross-members (26A, 26B, 26C, 26D and 26E) is drive member (68). Located near side rail (24') and above cross members (26A, 26B, 26C, 26D and 26E) is drive member (68'). As illustrated, each drive member (68, 68') is a chain. However, within the scope of the present invention, other types of drives can be utilized to advance endless loop (90).

Figure 3:
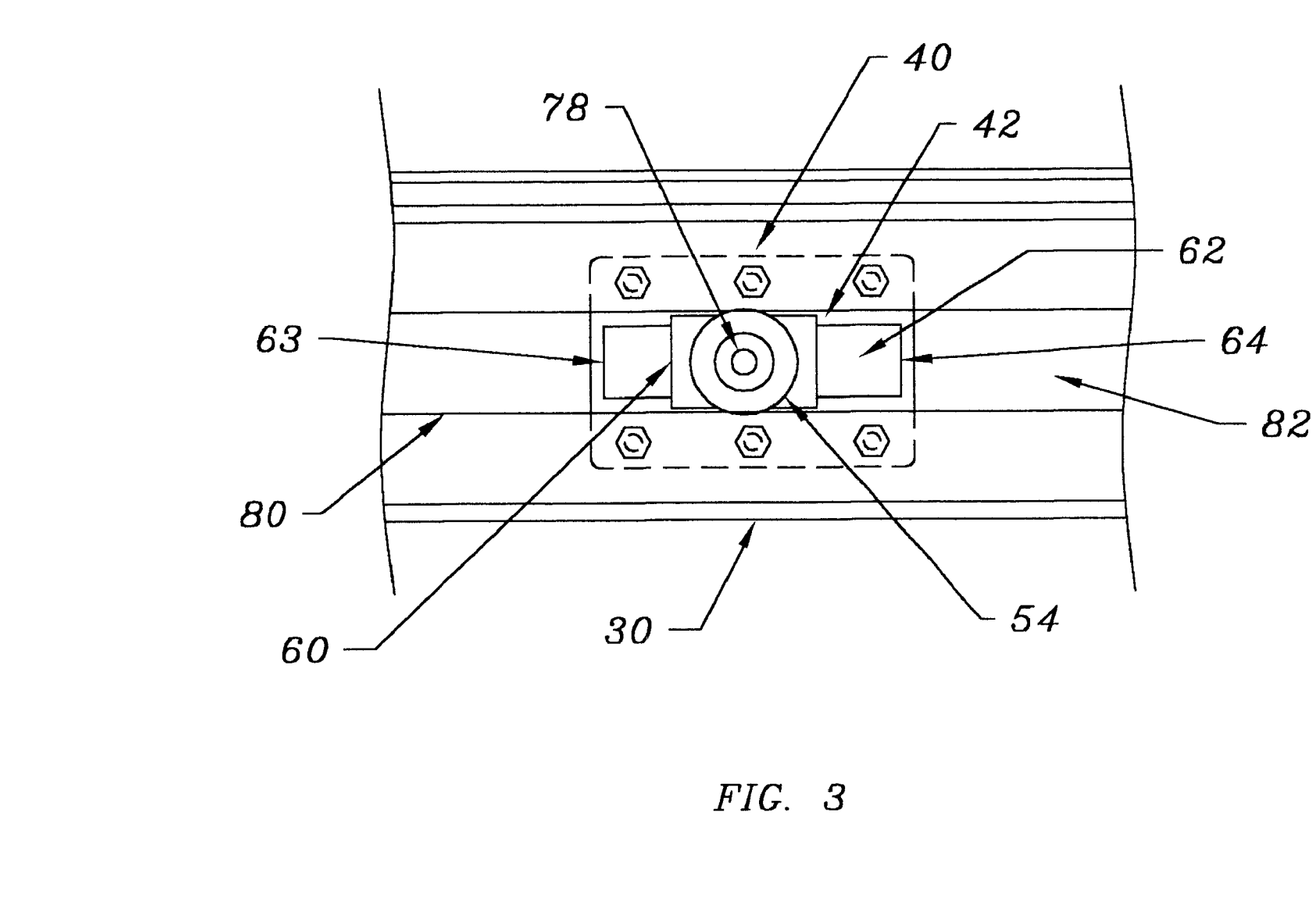
FIG. 3 is a sectional bottom view of an embodiment of the present invention that portrays a mechanical delay of the follower.

FIG. 3 is a sectional bottom view of an embodiment of the present invention depicting a mechanical delay (60) for follower (40). Clasp (42) of follower (40) tracks in guide bearing (80) of carrier (30). Depending downward from clasp (42) is rider (78). Clasp (42) can be provided with grooves (not shown) for rider (78). Coupling rider (78) with the grooves of clasp (42) allows rider to travel about the length of slot (62). End (63) and (64) of slot (60) function as a catch. Thus, when rider (78) engages end (63) or end (64) of slot (60) of clasp (42), it causes follower (40) to move belt (38) about slat (not shown). Slot (62) is dimensioned to provide at least a one centimeter leeway. However, it has unexpectedly been determined that at least a two centimeter leeway on either side of rider (64) provides for a more efficient use of the current sorter. With a view toward FIGS. 3, 4, 5, 7, 8, 10 and 11, it is disclosed that clasp (42) of follower (40) rides within guide bearing (80) of carrier (30), and rider (78) depends downward through slit (82) of guide bearing (80).

Figure 4:
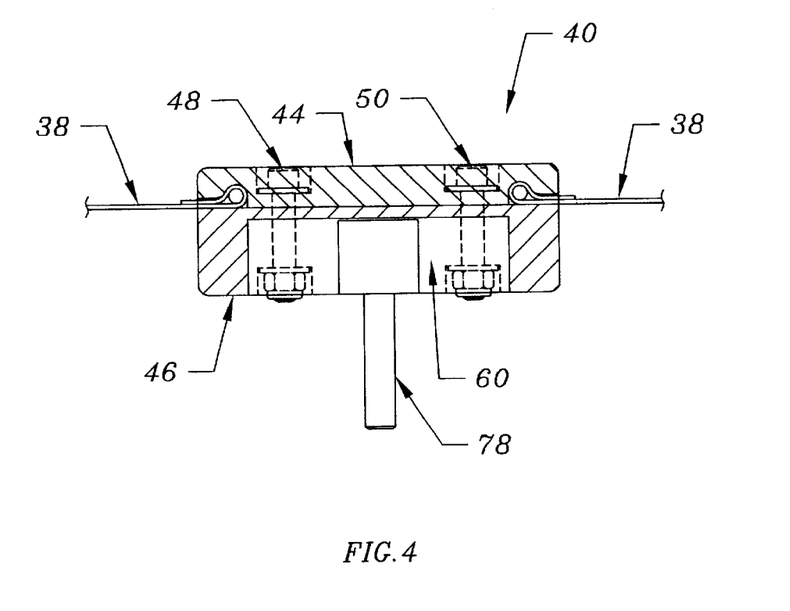
FIG. 4 is a lateral view of a follower's clasp of the present invention.

Turning to FIG. 4, a side view of an embodiment of clasp (42) of the present invention is portrayed. Clasp (42) of follower (40) includes upper section (44) and lower section (46). Upper section (44) and lower section (46) clasp belt (38) about the slat (not shown). In other words, the upper section (44) of clasp (42) is proximate the lower planar side of the slat (not shown) while rider (78) depends downward from slot (60) of follower (40). In this particular embodiment, bolts (48) and (50) secure upper section (44) of clasp (42) to lower section (46) of clasp (42). However, other means can be utilized to secure upper section (44) of clasp (42) to lower section (46) of clasp (42).

Figure 5:
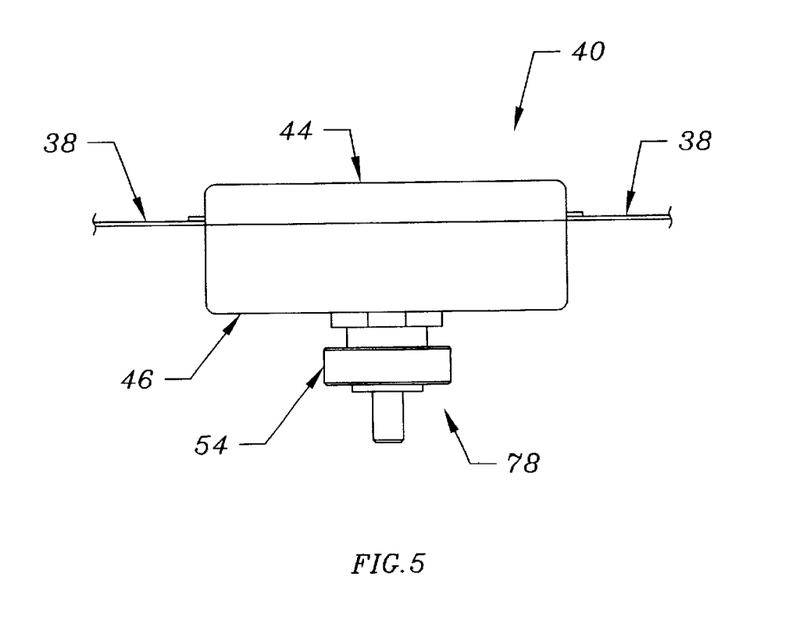
FIG. 5 is another view of a second type of follower, within the scope of the present invention.

Another embodiment of the present invention's follower is disclosed in FIG. 5. Follower (40) includes rider (78) depending downward from lower section (46) of clasp (42). Rider (78) is further provided with depending bearing (54). And although not shown in this view, follower can also include delay (60). As best indicated by the FIG. 12 cutaway, in operation, rider (78) and depending bearing (54) are directed by either lines, crossovers, diverters, receivers and/or switches. However, those skilled in the art, understand that follower (40) can be driven by electromagnetic induction. For example, a magnet (not shown) can be attached or incorporated into lower section (46) of clasp (42). Thus, follower (40) can respond to the electromagnetic activation.

Figure 6:
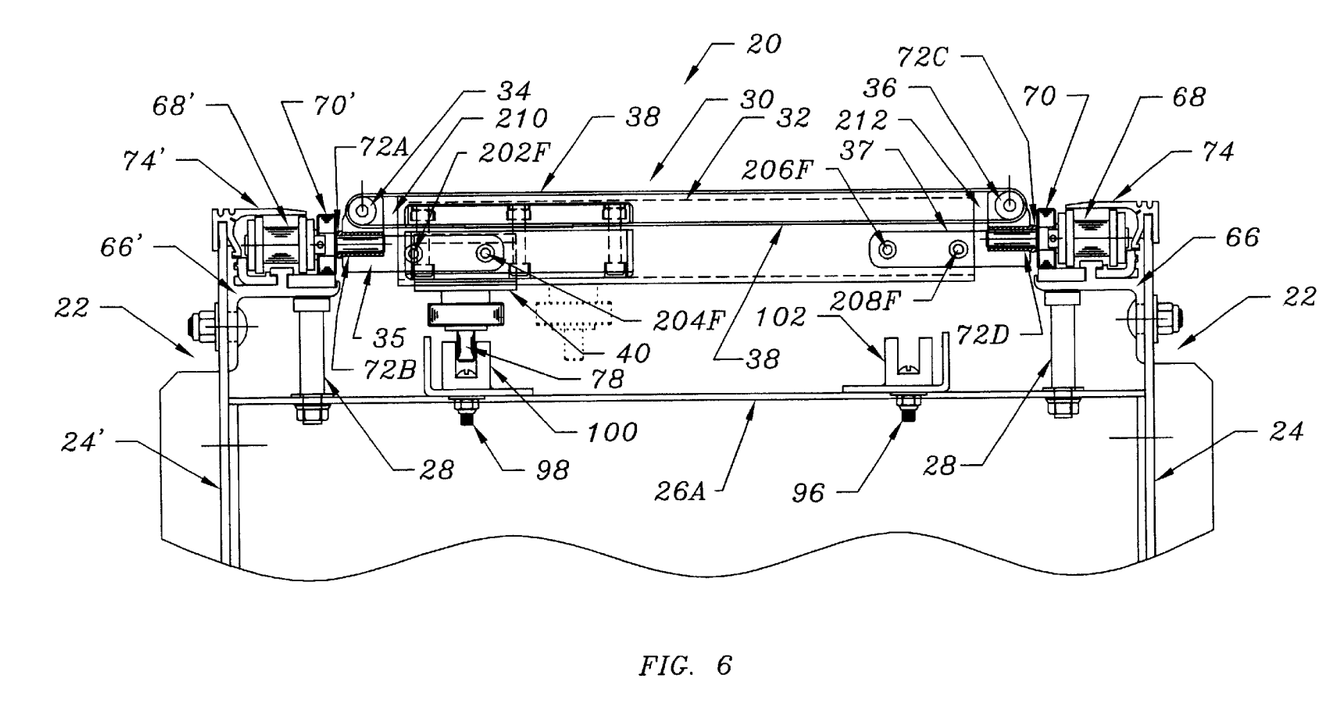
FIG. 6 is a frontal perspective of the sorter showing the upper half of the endless loop.

FIG. 6 is a frontal perspective of sorter (20) showing the upper half (92) of endless loop (90). Only the structural elements associated with a single carrier (30) of the plurality of carriers (30 A, B, C, D, E, etcetera) of endless loop (90) are portrayed in the view. Other carriers of the plurality of carriers (30 A, B, C, D, E, etcetera) of endless loop (90) can have comparable, if not identical, structures. And although not shown, as endless loop (90) circulates lower half (94) is controlled and guided in any manner acceptable in the art, including such configurations, as catenary take-ups.

With a view still toward FIG. 6, frame (22) supports line (100) and carrier (30). Cross-member (26A) secures side rail (24') to side rail (24). Bolt (98) attaches line (100) to cross-member (26A) and bolt (96) affixes line (102) to cross-member (26A). Drive (68') rides along platform (66') that extends inward from side rail (24') of frame (22), and drive (68) rides along platform (66) that extends inward from side rail (24) of frame (22). In this particular embodiment, braces (28) and (28') extend respectively between cross-member (26A) and platforms (66) and (66').

At a first side of sorter (20), couplers (72A and 72B) of connector (70') connect carrier (30) to drive (68'). Cover (74') extends over drive (68') and inward from side rail (24'). At a second side of sorter (20), couplers (72C and 72D) of connector (70) connect carrier (30) to drive (68). Cover (74) extends over drive (68) and inward from side rail (24).

Connectors (70' and 70) can be made in a generally U-shape to bend respectively about ends (35) and (37) of slat (32) of carrier (30).

In this specific view, carrier (30) includes slat (32), roller (34), roller (36), belt (38) and follower (40). Roller (34) is disposed at the opposite end of slat (32) from roller (36). Connector (70') can support slat (32) and also include bracket (not shown) to support roller (34). Similarly, connector (70) can support slat (32) and also include bracket (not shown) to support roller (36). In other embodiments, slat (32) can be manufactured to incorporate first outwardly curved edge and second outwardly curved edge (not shown), thereby eliminating the rollers (34, 36).

As revealed this frontal perspective, slat (32) can be equipped with apertures (not shown) to receive bolts (202F), (204F), (206F) and (208F) for coupling connectors (70' and 70) to slat (32). Although not shown, those skilled in the art recognize that the reward side of slat (32) can also be equipped with apertures for receiving bolts (202R), (204R), (206R) and (208R). The slat, bolt, aperture combination allows for adjustment of the tension on belt (38) of carrier (30). Thus, by increasing or decreasing the widths of spaces (210 and 212), the tension on belt (38) is modified.

With a view still toward FIG. 6, rider (78) of follower (40) depends downward and engages line (100). Follower (40) will travel along line (100) until diverted onto a crossover (not shown). Upon diversion, follower (40) imparts transverse motion to belt (38), until follower (40) engages line (102). In other words, follower (40) moves belt (38) about the lengthwise periphery of slat (32). And in this particular embodiment, the lengthwise periphery of slat (32) is parallel to the cross-member (26A). Thus, when follower (40) is diverted from line (100) to line (102) transverse motion is imparted to belt (38) such than an item to be sorted is moved in an opposite direction from line (102). And when predetermined paradigms require, a series of followers (40A, 40B, 40C, etcetera) can be diverted from line (100) to line (102). By way illustration and within the scope of the present invention, a series of followers can be diverted when the item to be sorted has a size greater than the width of a single carrier's belt.

Figure 7:
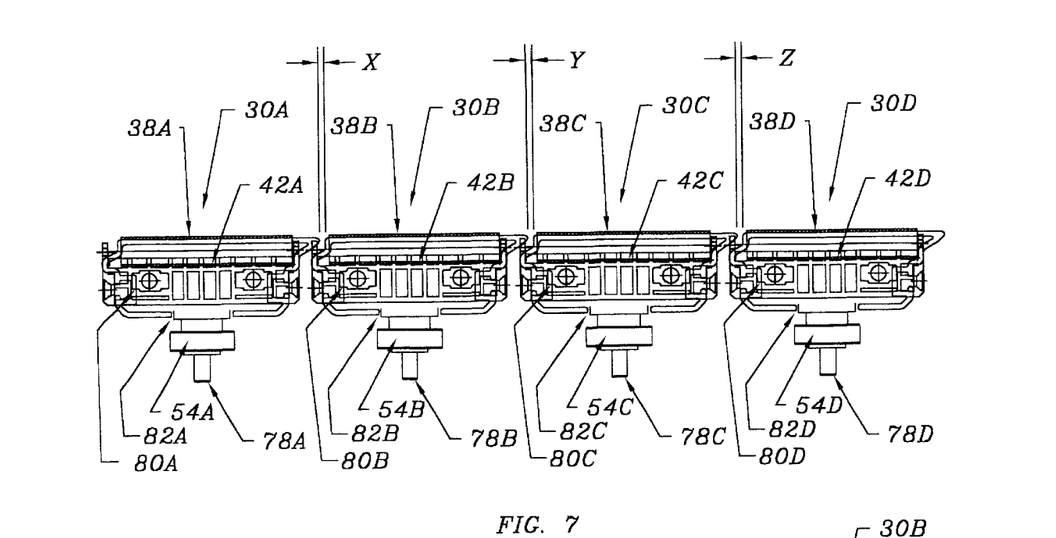
FIG. 7 is a side view of a section of the endless loop, with the frame, cross-members, drive and connectors cut away.
Figure 8:
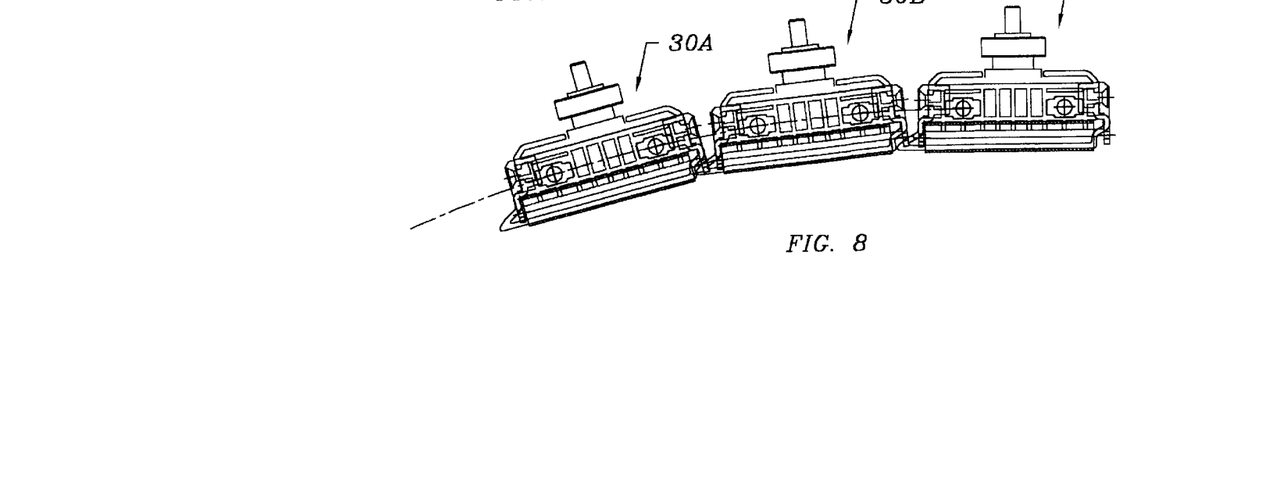
FIG. 8 is lateral view of a portion of FIG. 7's carriers disclosing the reverse pivot configuration.

FIG. 7 is a side view of a section of endless loop (90) of sorter (20), with frame (22), cross-members (26), drive (68) and couplers (72A, 72B, etcetera) of connectors (70) cut away. Belts (38A), (38B), (38C) and (38D) are fitted and wrapped about the lengthwise periphery of their corresponding slats (not shown) of carriers (30A), (30B), (30C) and (30D). Depending downward respectively from each carrier (30 A, B C and D) are riders (78 A, B, C and D) including depending bearings (54 A, B, C and D). Riders (78 A, B, C and D) can travel the length of their corresponding slits (82 A, B, C and D) of guide bearings (80 A, B, C and D). As shown in FIG. 7, carriers (30A), (30B), (30C) and (30D) are configured to show their forward pivoting ability, while in FIG. 8, carriers (30A), (30B) and (30C) are shown in a reverse pivot configuration, such as carriers (30A), (30B) and (30C) may encounter when traversing the previously enabled lower half of the endless loop.

As shown in FIG. 7, the vertical lines of zone X represent the narrowest hiatus separating (30A) from carrier (30B). The vertical lines of zone Y represent the narrowest hiatus between carrier (30B) and carrier (30C) while the lines of zone Z represent the hiatus separating carrier (30C) from carrier (30D). It has been determined that the distance for each of the zones X, Y or Z, etcetera, can be dimensioned to be twenty millimeters or less.

Figure 9:
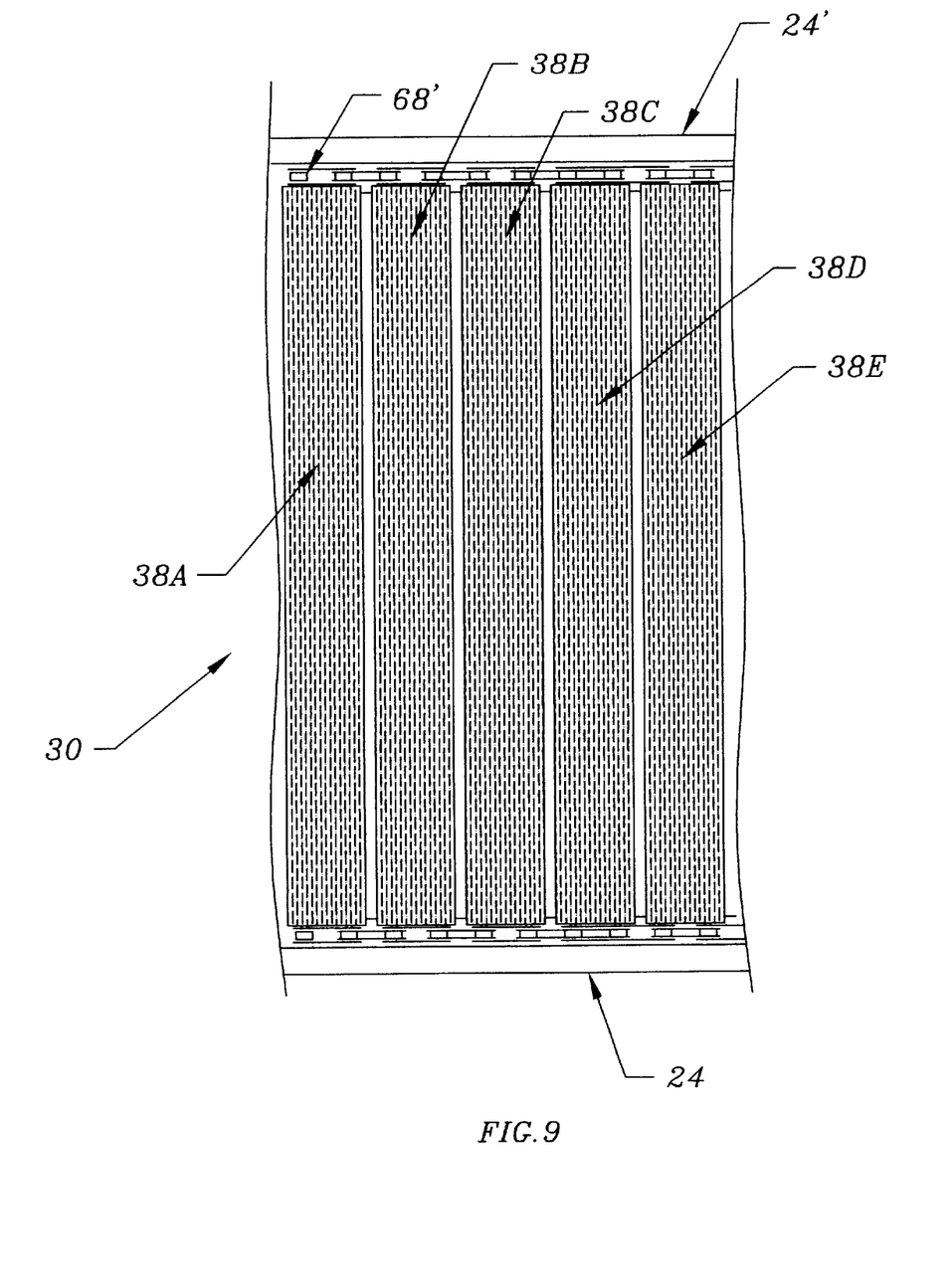
FIG. 9 is a top plan view of a section of the endless loop.

FIG. 9 is a top plan view of a section of endless loop (90). From this perspective, it seen that the distances between belts (38A) and (38B), belts (38B) and (38C), belts (38C) and (38D), and belts (38D) and (38E) are virtually eliminated. In fact, the hiatuses of each zones X, Y, Z, so forth and so on, are limited only by the structural parameters necessary for any of the plurality of carriers (30 A, B, C, D, E, etcetera) to freely reverse pivot, as endless loop (90) is circulated.

Figure 10:
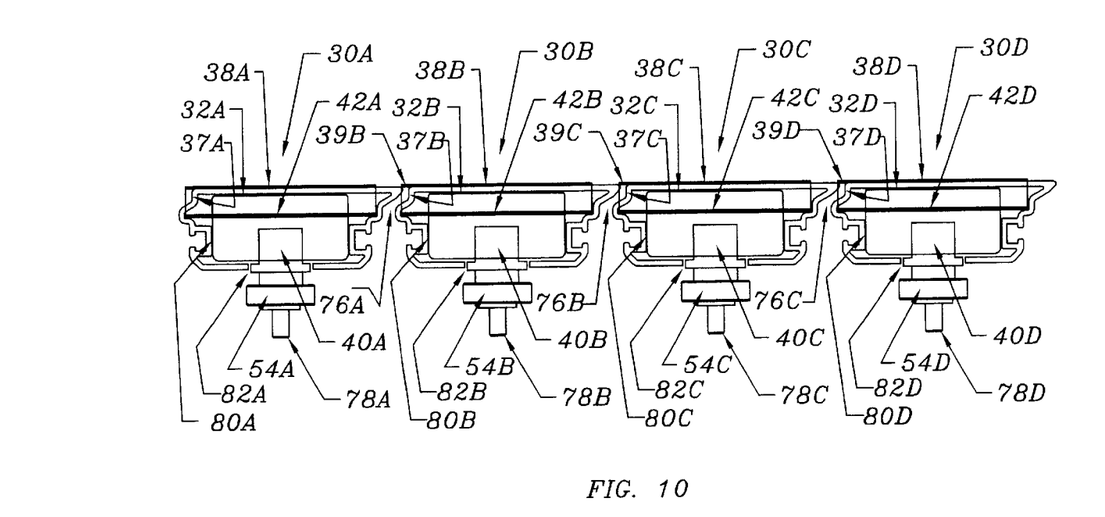
FIG. 10 is a sectional side view of another embodiment of the present invention.

In FIG. 10, a sectional side view of another embodiment of the present invention is disclosed. Belts (38A), (38B), (38C) and (38D) are wrapped about the lengthwise periphery of their corresponding slats (32A), (32B), (32C) and (32D) of their respective carriers (30A), (30B), (30C) and (30D). As shown, gap (76A) is between carriers (30A) and (30B); gap (76B) is between carriers (30B) and (30C); and gap (76C) is between carriers (30C) and (30D). Portion (39B) of belt (38B) protrudes over the lengthwise edge (37B) of slat (32B) to contact slat (32A) thereby preventing items to be sorted from falling into gap (76A). In a similar manner, portion (39C) of belt (38C) protrudes over the lengthwise edge (37C) of slat (32C) to contact slat (32B) to prevent items from falling into gap (76B) while portion (39D) of belt (38D) protrudes over the lengthwise edge (37D) of slat (32D) to contact slat (32C) to prevent items from falling into gap (76C).

Figure 11:
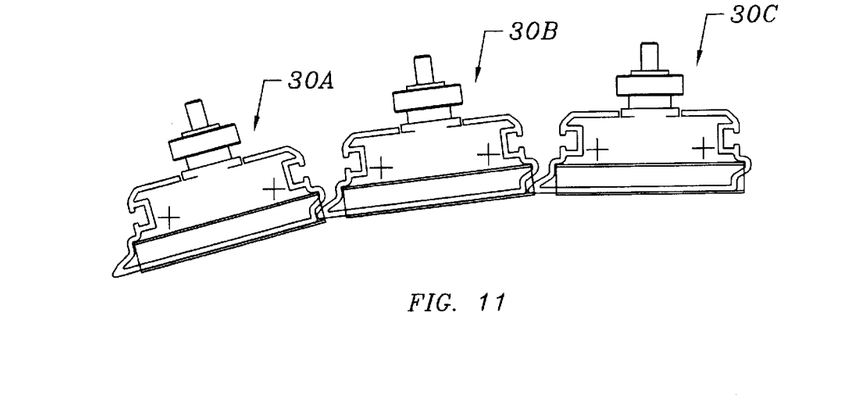
FIG. 11 is lateral view of a portion of FIG. 10's carriers disclosing the reverse pivot configuration.

With reference still to FIG. 10, depending downward respectively from each carrier (30 A, B, C and D) are riders (78 A, B, C and D) including depending bearings (54 A, B, C and D). Clasps (42 A, B, C and D) of followers (40 A, B, C and D) ride in guide bearings (80 A, B, C and D). And riders (78 A, B, C and D) can travel the approximate length of their corresponding slits (82 A, B, C and D) of guide bearings (80 A, B, C and D). As shown in FIG. 10, carriers (30A), (30B), (30C) and (30D) are configured to show their forward pivoting ability which will occur when carriers (30A), (30B), (30C) and (30D) are advancing in the upper half (92) of endless loop (90). In FIG. 11, carriers (30A), (30B) and (30C) are shown in a reverse pivoting configuration that occurs, if necessary, when carriers (30A), (30B) and (30C) are advancing in the lower half (94) of endless loop (90).

Figure 12:
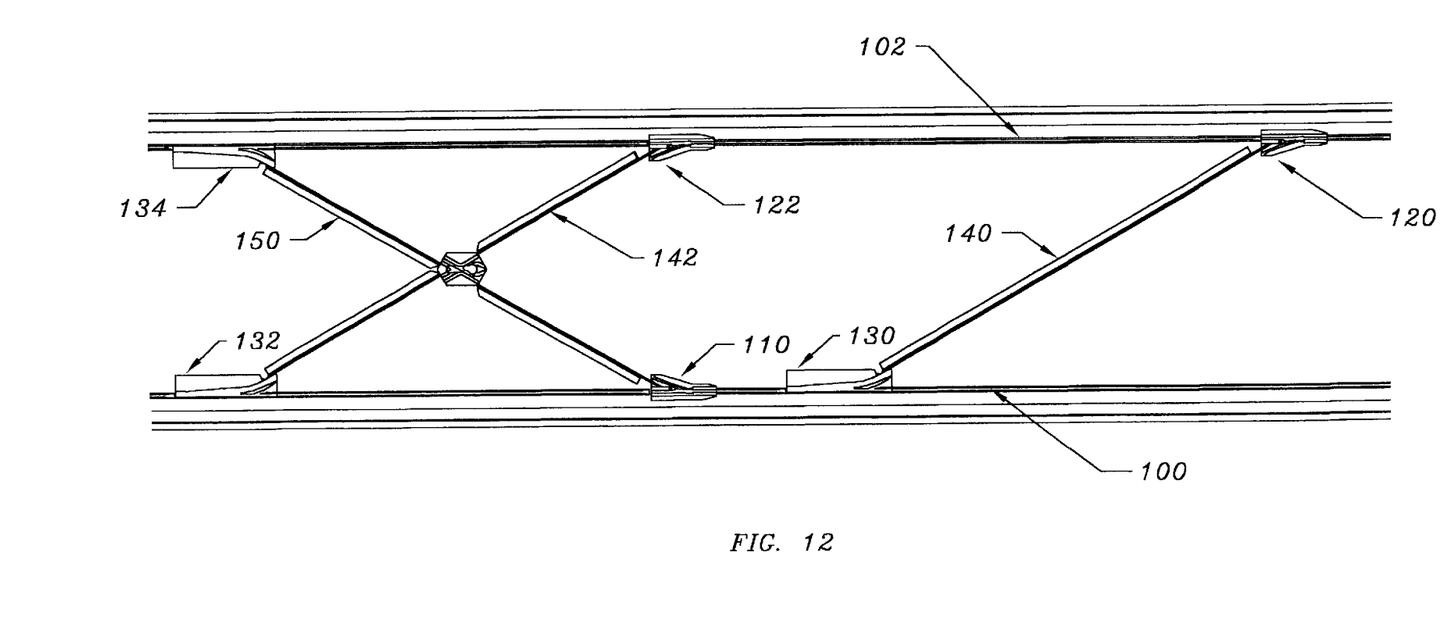
FIGS. 12 is a schematic representations of lines, diverters and crossovers of an embodiment of the present invention.

Applicant has previously disclosed mechanical structures for guiding followers (40 A, B, C, D, etcetera) of carriers (30 A, B, C, D, etcetera), but followers (40 . . . ) can also be guided by electromagnetic induction. With that in mind, FIG. 12 is a representation of lines, diverters, crossovers, receivers and switches that can be used to guide the followers (40 A, B, C, D, etcetera) of sorter's carriers (30 A, B, C, D, etcetera) of endless loop (90).

Line (100) includes diverter (110). Line (102) intersects diverter (120) and diverter (122). Crossover (140) runs from diverter (120) to receiver (130) of line (100), and crossover (142) runs from diverter (122) to receiver (132) of line (100). Crossover (150) runs from diverter (110) of line (100) to receiver (134) of line (102). Select embodiments can also incorporate switch (170) at the junction of crossover (142) and crossover (150). And depending upon predetermined sorting parameters, additional diverters, receivers and switches are within the scope of the present invention.

A controller, such as, a computer program, and its corresponding circuitry (not shown) control diversion of the endless loop's carriers' followers. In accordance with a predetermined paradigm, the sorter's diverters divert one or more of the followers (40 A, B, C, D, etcetera). As a follower (40) is guided through a crossover, its corresponding carrier's belt (38) moves about the lengthwise periphery of the slat (32) causing an item carried by the belt (38) to be sorted.

Figure 13:
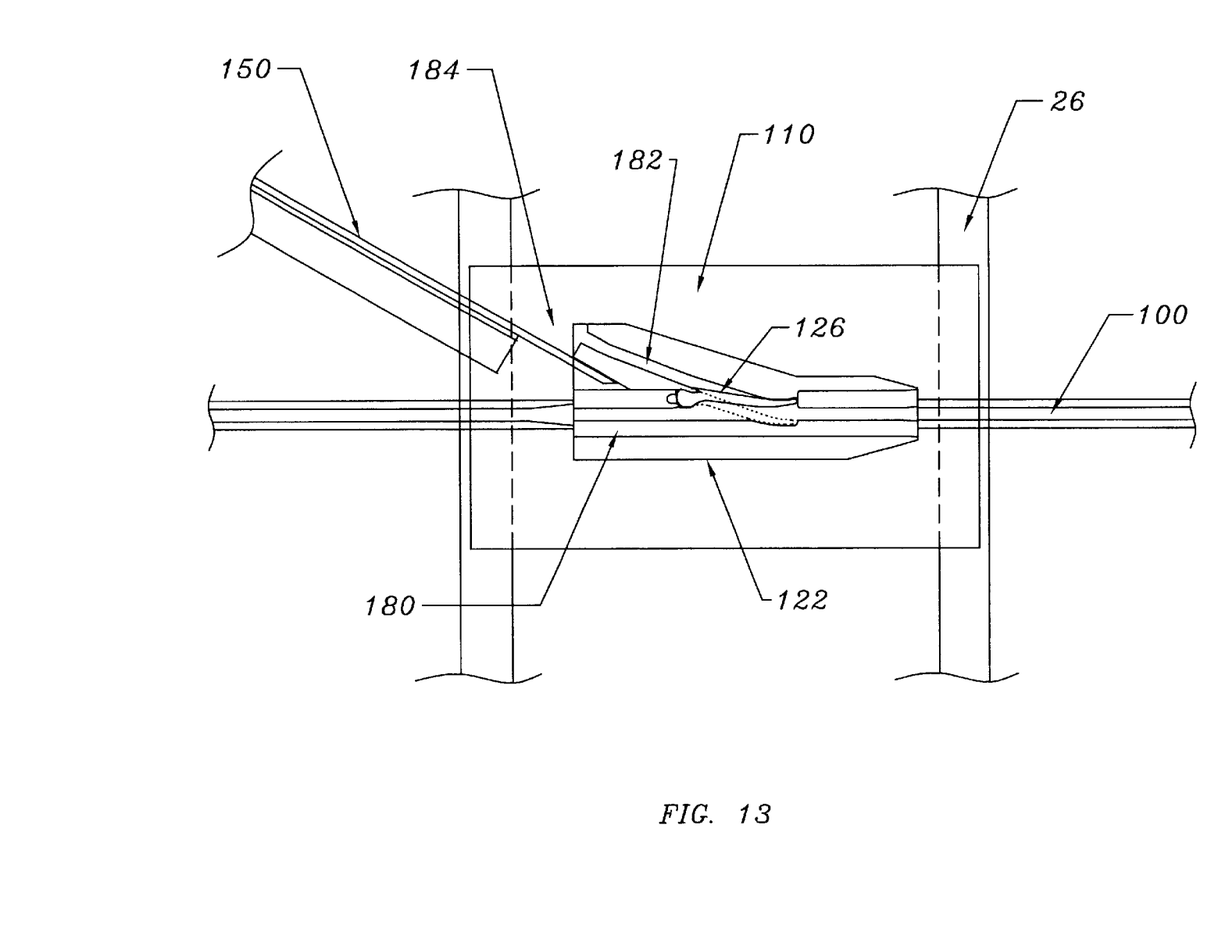
FIG. 13 is a top perspective of a diverter, within the scope of the present invention.
Figure 14:
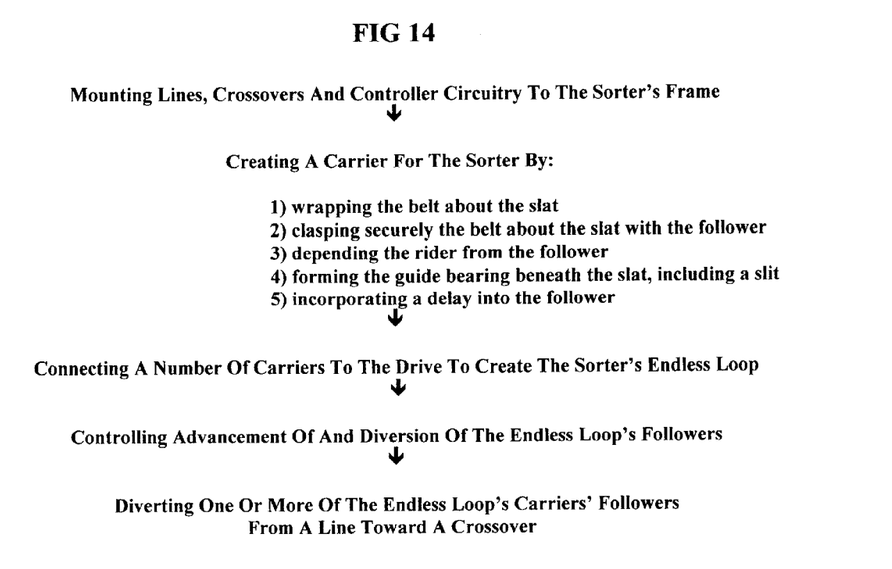
FIG. 14 is an illustration of the steps of an embodiment of the present method.
Figure 15:
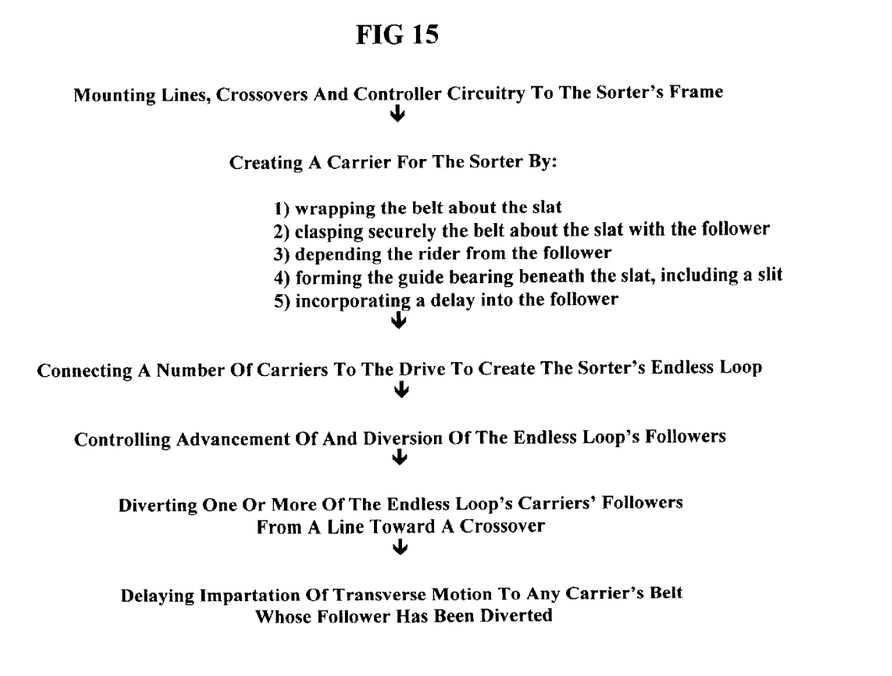
FIG. 15 is a depiction of the steps of another embodiment of the present invention.
Figure 16:
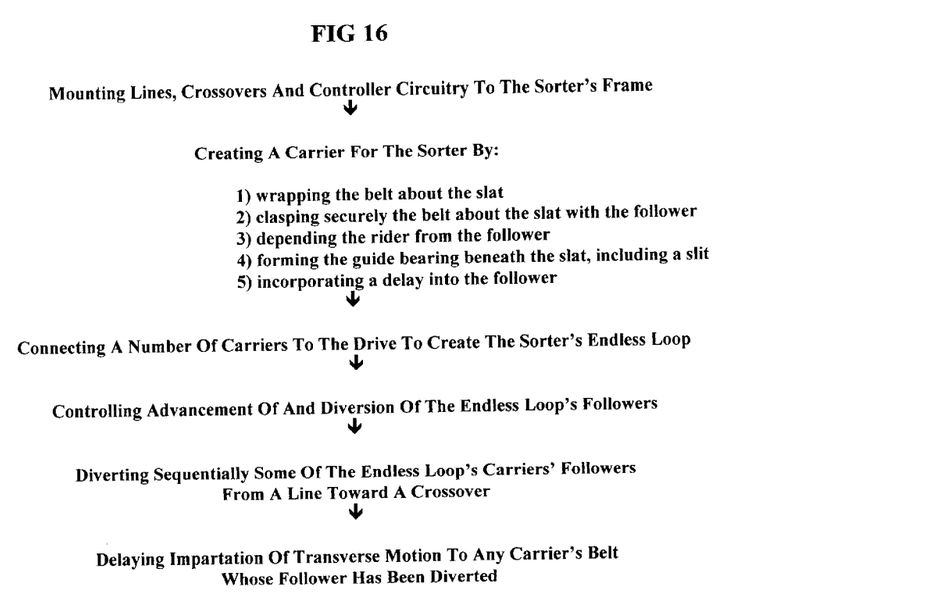
FIG. 16 is an exemplification of the steps of yet another embodiment of the current method.
Figure 17:
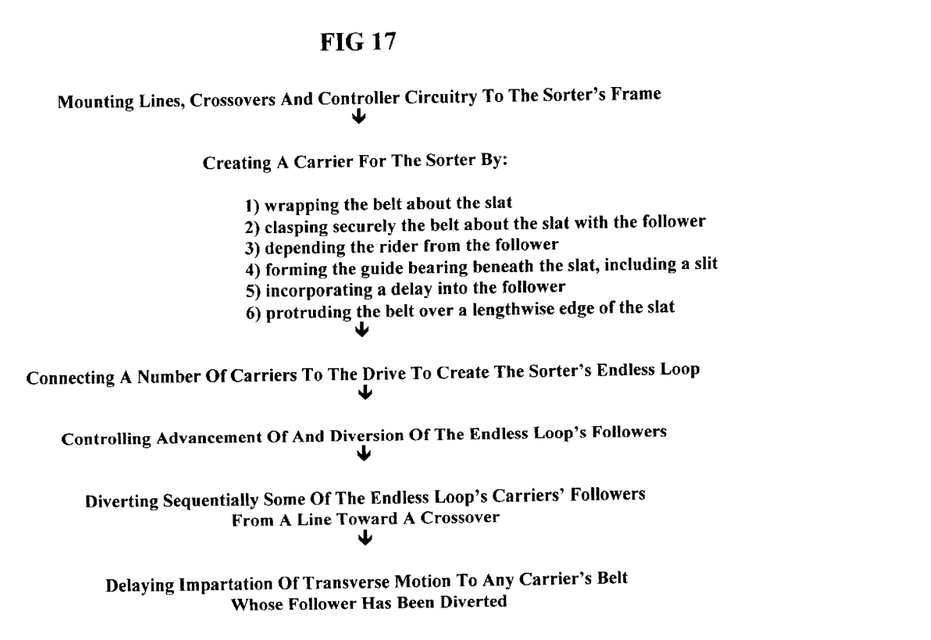
FIG. 17 is a depiction of the steps of still another embodiment of the present invention.
Figure 18:
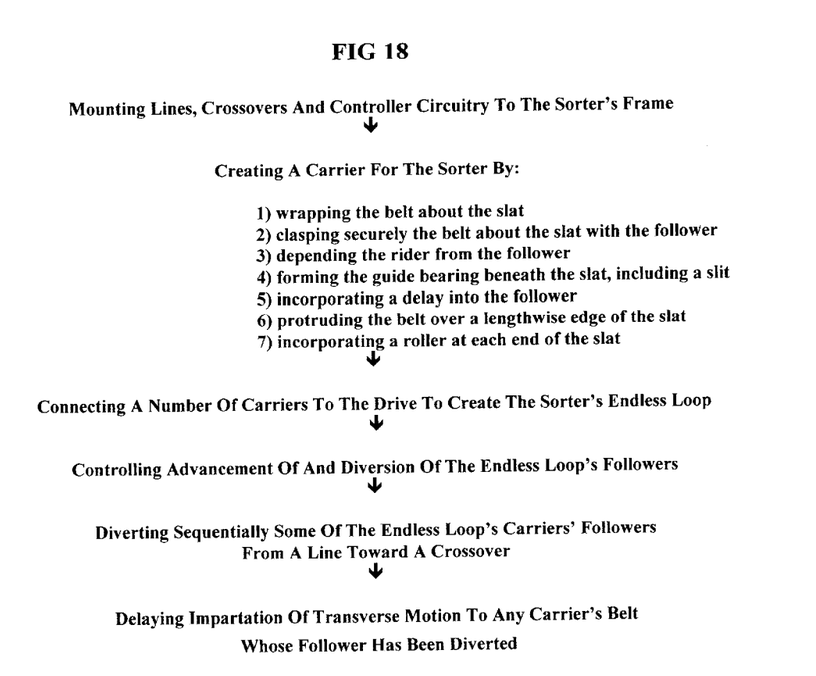
FIG. 18 is an illustration of the steps of yet another embodiment of the present method.
Figure 19:
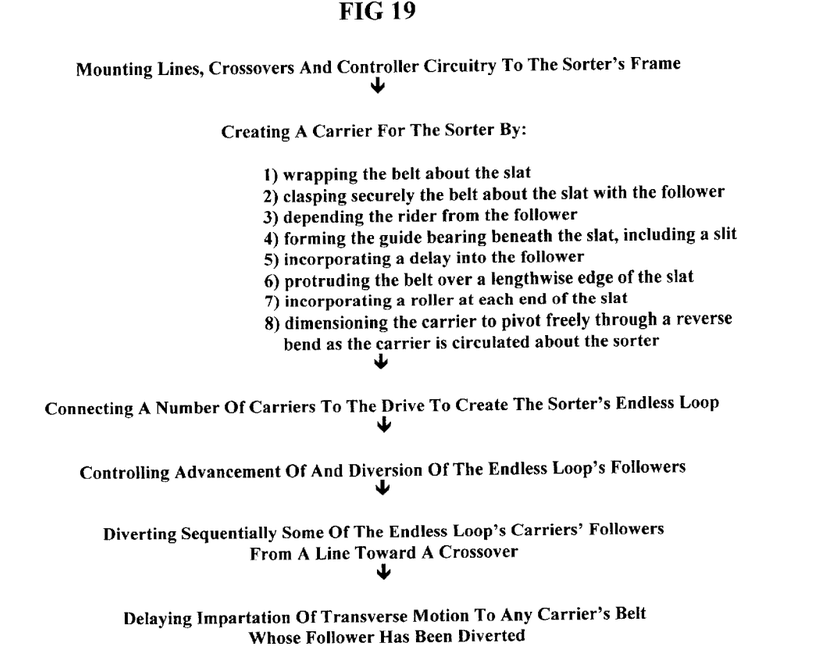
FIG. 19 is an exemplification of the steps of yet another embodiment of the current method.

FIG. 13 is a top perspective of a type of diverter (110) that can be utilized to practice the present sorter. However, it is to be understood that other diverter structures are within the scope of the current invention. Diverter (110) is attached to cross-member (26) through any manner acceptable in the art. Although not shown, the diverter (110) is linked to the controller via the necessary circuitry. Diverter (110) is constructed of metal or plastic and is designed to include channel continuance (180) fitted and aligned with line (100). Upon activation gate (126) closes channel continuance (180) and diverts follower (not shown) into divert groove (182) leading to crossover (150).

It has been unexpectedly determined that carriers (30 A, B, C, D, etcetera) incorporating followers (40 A, B, C, D, etcetera) having depending bearings (54 A, B, C, D, etcetera) and including the previously identified delays (60 A, B, C, D, etcetera) reduce the wear and tear of diverter (110). By way of illustration, when the leeway of slot (62) is greater than the length of divert groove (182) and intervening space (184) between diverter (110) and crossover (150), followers (40 A, B, C, D, etcetera) do not impart transverse motion to belts (38 A, B, C, D, etcetera), until followers (40 A, B, C, D, etcetera) engage crossover (150). In this way, the current invention meets the long felt need of reducing transverse motional stress to diverter (110) resulting less wear tear of the diverter.

Within the scope of the present invention, predetermined parameters determine the numerous configurations for the layouts of the sorter's lines, crossovers, diverters and receivers. The current sorter can be utilized to sort a plethora of items of differing sizes. When the size of the item to be sorted is smaller than the width of belt (38) of carrier (30), a diverter can divert a single follower (40) from a line to a crossover. And by utilizing the gap-eliminating embodiments of the present sorter, the protruding belts (38 A, B, C, D, etcetera) of carriers (30 A, B, C, D, etcetera) prevent the smaller items and/or smaller parts of the larger items from falling into gaps (76 A, B, C, D, etcetera). When the size of the item to be sorted is larger than the width of a single belt (38) of a single carrier (30), the controller can activate the diverter to diverter a series of sequential followers (40 A, B, C, D, etcetera) from a line to a crossover, thereby sorting the larger item. Additionally, those skilled in the art, recognize that the use of multiple diverter, crossover and receiver embodiments provides for the simultaneous sortation of items.

Steps associated with the practice of the methods of present invention utilizing select structural elements enabled above are set forth in FIGS. 14–19. Having disclosed the invention as required by Title 35 of the United States Code, Applicants now pray respectfully that Letters Patent be granted for their invention in accordance with the scope of the claims appended hereto.

What is claimed is:

1. A sorter for sorting a plurality of items, comprising:
   a) an endless loop having an upper half positioned above a lower half;
   b) said endless loop further comprising a plurality of carriers circulating about said endless loop, wherein one or more of said carriers further comprises:
      i) a slat further including:
         A) a first widthwise edge;
         B) a second widthwise edge;
         C) a first lengthwise edge; and
         D) a second lengthwise edge;
      ii) a belt having a length approximate a lengthwise periphery of said slat;
      iii) a follower proximate said slat, including a rider:
         A) for clasping said belt about said slat; and
         B) for moving said belt about said lengthwise periphery of said slat;
      iv) a first connector at said first side of said carrier; and
      v) a second connector at said second side of said carrier;
   c) a plurality of lines for directing advancement of any of said plurality of carriers' followers;
   d) a plurality of crossovers, connecting at least two of said plurality of lines, for guiding transversely, relative to said endless loop's advancement, any of said plurality of carriers' followers;
   e) a diverter for diverting one or more of said plurality of carriers' followers from any of said plurality of lines onto one or more of said plurality of crossovers;
   f) a drive coupled to said first connector and said second connector of each carrier of said plurality of carriers for advancing said endless loop;
   g) a frame supporting said endless loop, said plurality of lines, said plurality of crossovers and said diverter; and
   h) a controller.

2. The invention of claim 1 wherein one or more of said plurality of carriers' riders further comprise a depending bearing.

3. The invention of claim 2 wherein one or more of said plurality of carriers' followers further comprise a delay.

4. The invention of claim 3 wherein one or more of said plurality of carriers' including said delay further comprise a guide bearing for said follower.

5. The invention of claim 4 wherein each of said plurality of carriers is contiguous with its immediately preceding carrier and its immediately succeeding carrier such that a hiatus between each of said plurality of carrier's belts is virtually eliminated.

6. The invention of claim 5 wherein said diverter diverts, in series, more than one of said plurality of carriers' followers for sorting one or more of said plurality of items.

7. The invention of claim 6 further comprising more than one said diverter.

8. The invention of claim 7 wherein each belt of said endless loop protrudes over a lengthwise edge of each carrier's slat of said endless loop such that a gap between each of said endless loop's plurality of carriers is eliminated.

9. The invention of claim 8 wherein each said carrier of said endless loop is dimensioned to pivot about a reverse bend without obstructing its immediately preceding carrier or its immediately succeeding carrier.

10. A carrier for carrying a plurality of items for sorting, comprising:
   a) a slat, further comprising:
      i) a first widthwise edge;
      ii) a second widthwise edge opposite said first widthwise edge
      iii) a first lengthwise edge; and
      iv) a second lengthwise edge opposite said first lengthwise edge;
   b) a belt, having a length approximate a lengthwise periphery of said slat, fitted for and wrapped about said lengthwise periphery of said slat;
   c) a follower proximate said slat, including a rider;
      i) for clasping said belt about said slat;
      ii) for causing said belt to move about said lengthwise periphery of said slat;

iii) for following a line or a crossover; and
iv) for responding to a diverter;
d) a guide bearing beneath said slat for said follower;
e) a first connector for coupling a first side of said carrier to a drive; and
f) a second connector for coupling a second side of said carrier to said drive.

11. The invention of claim 10 wherein said belt protrudes over a first lengthwise edge of said slat.

12. The invention of claim 11 wherein said follower further comprises a delay.

13. The invention of claim 12 wherein said rider further comprises a depending bearing.

14. The invention of claim 13 wherein said delay further comprises a slot having a leeway of at least one centimeter.

15. The invention of claim 14 further comprising:
a) a first roller mounted to said first widthwise edge of said slat; and
b) a second roller mounted to said second widthwise edge of said slat.

16. A method of imparting transverse motion to a belt of a carrier of an endless loop, comprising the steps of:
a) mounting to a frame:
i) a plurality of lines;
ii) a plurality of crossovers;
iii) a plurality of diverters; and
iv) circuitry for a controller;
b) creating a carrier, further comprising the steps of:
i) wrapping said belt about a slat;
ii) clasping securely said belt about said slat with a follower;
iii) depending a rider from said follower;
iv) forming a guide bearing beneath said slat for said follower;
v) including a slit in said guide bearing for said follower; and
vi) incorporating a slot delay into said follower;
c) connecting a plurality of said carriers to a drive for creating said endless loop;
d) controlling advancement of and diversion of said endless loop's carriers' followers via:
i) said plurality of lines;
ii) said plurality of diverters; and
iii) said plurality of crossovers;
e) diverting one or more of said endless loop's carriers' followers from at least one of said plurality of lines onto at least one of said plurality of crossovers; and
f) delaying impartation of transverse motion to any belt whose follower has been diverted toward one of said plurality of crossovers.

17. The method of claim 16 wherein at least two sequential followers are diverted, in series.

18. The method of claim 17 further comprising the step of protruding each said carriers' belt over a lengthwise edge of each said carriers' slat.

19. The method of claim 18 further comprising the steps of:
a) incorporating a first roller at a first widthwise end of each said carriers' slat; and
b) incorporating a second roller at a second widthwise end of each said carriers' slat.

20. The method of claim 19 further comprising the step of dimensioning each of said endless loop's carriers to pivot freely, without obstructing its immediately preceding carrier or its immediately succeeding carrier, as said endless loop travels through a reverse bend.

21. A sorter for sorting a plurality of items, comprising:
a) an endless loop having an upper half positioned above a lower half;
b) said endless loop further comprising a plurality of carriers circulating about said endless loop, wherein each said carrier further comprises:
i) a slat further comprising:
A) a first widthwise edge;
B) a second widthwise edge opposite said first widthwise edge
C) a first lengthwise edge; and
D) a second lengthwise edge opposite said first lengthwise edge;
ii) a belt having a length approximate a lengthwise periphery of said slat;
iii) a follower, including a rider and a depending bearing:
A) for clasping said belt about said slat; and
B) for moving said belt about said lengthwise periphery of said slat;
iv) a first connector at said first side of said carrier;
v) a second connector at said second side of said carrier; and
vi) a guide bearing for said follower;
c) a plurality of lines for directing advancement of any of said plurality of carriers' followers;
d) a plurality of crossovers, connecting at least two of said plurality of lines, for guiding transversely, relative to said endless loop's advancement, any of said plurality of carriers' followers;
e) a plurality of diverters for diverting, in series, some of said plurality of carriers' followers from any of said plurality of lines onto one or more of said plurality of crossovers;
f) a drive coupled to said first connector and said second connector of each carrier of said plurality of carriers for advancing said endless loop;
g) a frame supporting said endless loop, said plurality of lines, said plurality of crossovers and said plurality of diverters; and
h) a controller.

22. The invention of claim 21 wherein each follower of said plurality of carriers further comprises a delay.

23. The invention of claim 22 wherein each of said plurality of carriers is contiguous with its immediately preceding carrier and its immediately succeeding carrier such that a hiatus between each of said plurality of carriers' belts is virtually eliminated.

24. The invention of claim 23 wherein each belt of said endless loop protrudes over a lengthwise edge of each carrier's slat of said endless loop such that a gap between each of said endless loop's plurality of carriers is eliminated.

25. The invention of claim 24 wherein each said carrier of said endless loop is dimensioned to pivot about a reverse bend without obstructing its immediately preceding carrier or its immediately succeeding carrier.

26. The invention of claim 25 wherein each said carrier's belt further includes a length not greater than said lengthwise periphery of said slat in combination with a length of a horizontal cross-section of said clasp of said follower.

* * * * *